(12) United States Patent
Caddell

(10) Patent No.: US 8,274,184 B2
(45) Date of Patent: Sep. 25, 2012

(54) TORUS GEOMETRY MOTOR SYSTEM

(75) Inventor: Richard W. Caddell, Otis, IN (US)

(73) Assignee: Sullair Corporation, Michigan City, IN (US)

( * ) Notice: Subject to any disclaimer, the term of this patent is extended or adjusted under 35 U.S.C. 154(b) by 1496 days.

(21) Appl. No.: 11/043,343

(22) Filed: Jan. 26, 2005

(65) Prior Publication Data

US 2006/0163970 A1   Jul. 27, 2006

(51) Int. Cl.
  *F04B 17/04*   (2006.01)
(52) U.S. Cl. .................................... 310/14; 417/410.1
(58) Field of Classification Search ............... 310/10, 310/12–14; 417/320, 410.1; 91/151; 418/4
  See application file for complete search history.

(56) References Cited

U.S. PATENT DOCUMENTS

| | | | |
|---|---|---|---|
| 3,089,106 A | | 5/1963 | Saaty |
| 3,496,871 A | | 2/1970 | Stengel |
| 3,927,329 A | * | 12/1975 | Fawcett et al. ............... 290/1 R |
| 4,381,181 A | * | 4/1983 | Clegg ....................... 417/423.7 |
| 4,385,498 A | * | 5/1983 | Fawcett et al. ................. 60/650 |
| 5,850,111 A | | 12/1998 | Haaland |
| 6,798,090 B2 | * | 9/2004 | Cheung et al. ................. 310/17 |
| 2005/0169777 A1 | * | 8/2005 | Shen et al. ................. 417/410.1 |
| 2005/0200220 A1 | | 9/2005 | Godfrey |

FOREIGN PATENT DOCUMENTS

| | | |
|---|---|---|
| EP | 0 826 935 | 3/1998 |
| EP | 0 826 935 A | 3/1998 |
| FR | 2 666 627 | 3/1992 |
| FR | 2 666 627 A | 3/1992 |
| GB | 1 408 236 | 10/1975 |
| GB | 1 408 236 A | 10/1975 |
| JP | 61-143220 | 6/1987 |
| JP | 06-050257 | 2/1994 |
| JP | 09-065635 | 3/1997 |
| JP | 2000-358351 | 12/2000 |
| JP | 2002-112524 | 4/2002 |
| JP | 2002-272176 | 9/2002 |

OTHER PUBLICATIONS

PCT International Search Report, dated May 24, 2006.
International Search Report, International Application No. PCT/US2006/000539, International Filing Date Jan 9, 2006.
Written Opinion of the International Searching Authority, International Application No. PCT/US2006/000539, International Filing Date Jan. 9, 2006.
Japanese Office Action (translation), dated Mar. 29, 2010, JP Application No. 2007-553114.

* cited by examiner

*Primary Examiner* — Dang Le

(74) *Attorney, Agent, or Firm* — Carlson, Gaskey & Olds PC

(57) ABSTRACT

A torus motor system includes a hollow stator and a rotor which is driven along a rotor path formed within the hollow stator by a magnet system. The rotor operates as a piston within the rotor path to intake and discharge fluid therefrom. The forces on the rotor all tend to center the rotor within the rotor path. The rotor is accelerated away from the inlet port on the magnet system and decelerated as the rotor approaches the discharge port.

23 Claims, 17 Drawing Sheets

TORUS GEOMETRY MOTOR SYSTEM

BACKGROUND OF THE INVENTION

The present invention relates to a motor system, and more particularly to an electromagnetically driven rotary machine in which a rotor is electromagnetically driven within a hollow elliptical stator.

Reciprocating compressor/pumps are highly desirable for use in numerous applications, particularly in environments where liquid flow rate is relatively low and the required liquid pressure rise is relatively high. For applications requiring less pressure rise and greater flow rate, rotary centrifugal compressor/pumps may be favored because of their simplicity, inexpensive and low maintenance requirements.

A typical air compressor load increases almost linearly as the piston moves to compress the air. In a pump application the load is generally constant along the length of travel.

Although both are effective, the reciprocating and the rotary pump each provides tradeoffs which affect efficiency in a compressor/pump application.

Accordingly, it is desirable to provide a machine for pump/compressor applications with the benefits of both a reciprocating and a rotary machine which generally matches the required load to provide efficient operation.

SUMMARY OF THE INVENTION

A torus motor system according to the present disclosure includes a hollow stator and a rotor which is driven within the hollow stator by a magnet assembly. The hollow stator defines a rotor path which communicates a fluid from an inlet port to a discharge port. The rotor path is formed an ellipse within the stator. The rotor is at least partially arcuate in shape to match the internal elliptical geometry of the rotor path. The rotor operates as a piston within the rotor path to intake and discharge fluid therefrom. Although the geometry according to the present disclosure has wider use, the torus motor system is conceived primarily for pump/compressor applications.

A multitude of magnet types are usable with the present invention such that various motor types (i.e. induction, Permanent Magnet, Switched Reluctance etc.) will benefit from the torus geometry. The magnet geometry provides magnets that are spaced the farthest apart to move the rotor the fastest, but provide the lowest load (i.e. the magnetic attractive forces diminish with distance). Conversely, magnets that are spaced the closest move the rotor the slowest but provide much more load. This is preferred because as the rotor passes the inlet, there is minimal load applied to the rotor. The load increases as the rotor approaches the discharge because gas is compressed in front of the rotor and a vacuum is pulled behind the rotor. The magnets are therefore spaced farthest apart where the load is smallest, and closest where the load is the largest which is an advantage over linear reciprocating pump/compressors.

The torus motor and compressor (or pump) are one mechanism as opposed to a multiple of separate mechanisms as in a typical compressor or pump. The efficiency of the torus motor/compressor compares favorably with a rotary compressor because there are minimal air end and package losses because of less piping and the elimination of an oil separator. Because there are few components and no couplings or gears between the driving force and the work, efficiency is increased. Even if the torus motor has the same efficiency as a rotary compressor, a torus compressor will have a 15% to 20% power efficiency advantage.

Generally, the benefits of the torus motor/compressor versus a typical compressor are: very few moving parts; high reliability; oil free operation; high efficiency; uncomplicated and relatively inexpensive; effective speed control with variable speed drives; few leak points; sealed stator; and various speed/load capabilities readily achieved.

The present invention therefore provides a machine for pump/compressor applications with the benefits of both a reciprocating and a rotary machine which generally matches the required load to provide efficient operation.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
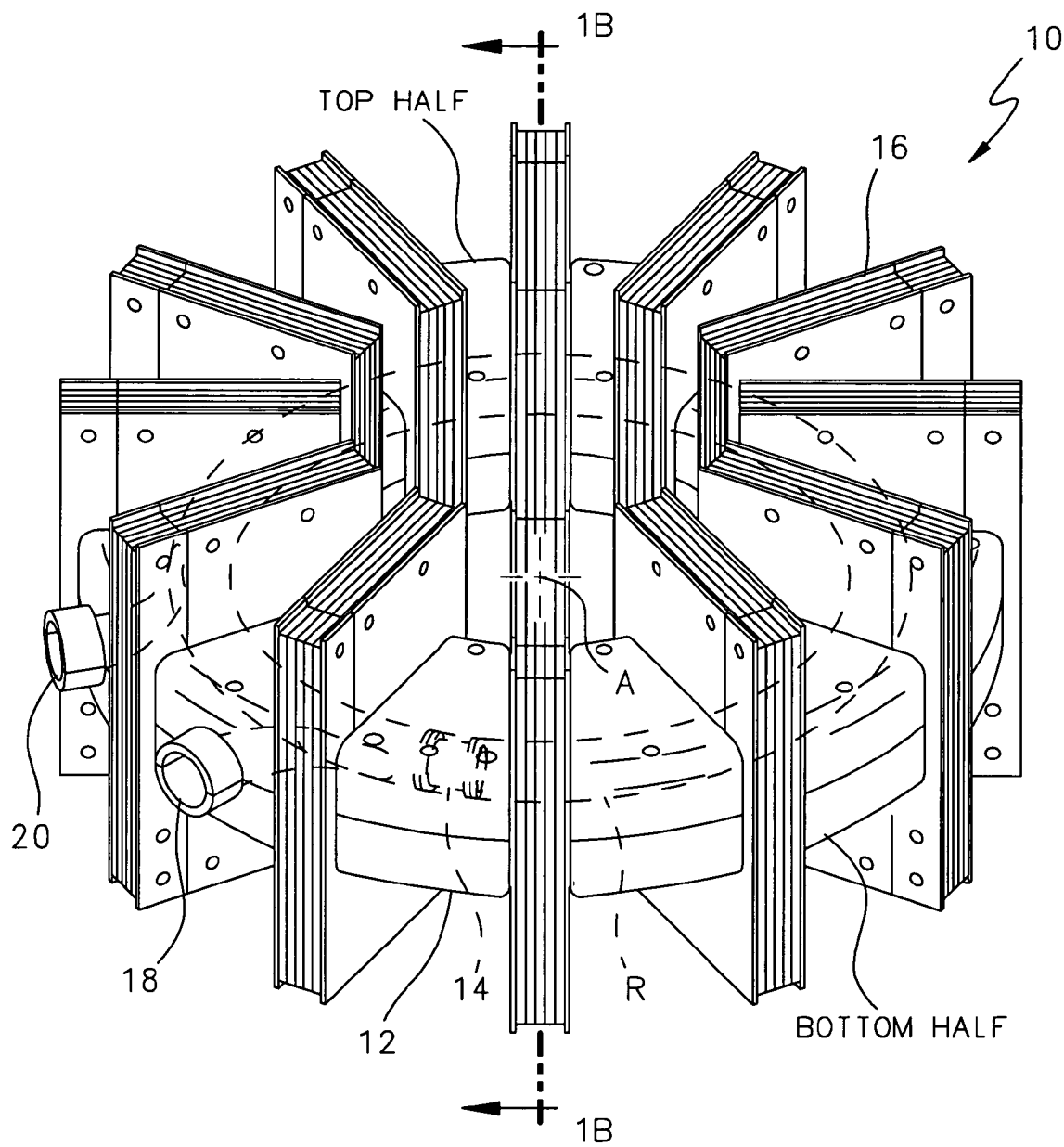
FIG. 1A is a general perspective view of an torus motor system.

FIG. 1A illustrates a torus motor system 10 that generally includes a hollow stator 12 and a rotor 14 which is driven within the hollow stator 12 by a magnet system 16. The motor and compressor (or pump) are one mechanism. As opposed to two (or more) separate mechanisms in a typical compressor or pump. Although the rotor of the torus motor system 10 does not actually rotate, but rather is driven in an elliptical path as defined by the hollow stator 12, Applicant will refer to the moving member of the motor as a rotor.

The hollow stator 12 defines an inlet port 18 and a discharge port 20 which communicates with the interior of the hollow stator 12. It should be understood that although the motor system 10 will be described as a compressor for a gas, other uses such as that of a fluid pump or a mechanical motor drive will likewise benefit from the present invention. A rotor path R is preferably formed as a ring defined about a center point A, however other shapes such as ellipses or the like will also be usable with the present invention. The rotor path R is also preferably circular in cross-section (FIG. 1B), however, other shapes may also be used with the present invention.

Figure 1B:
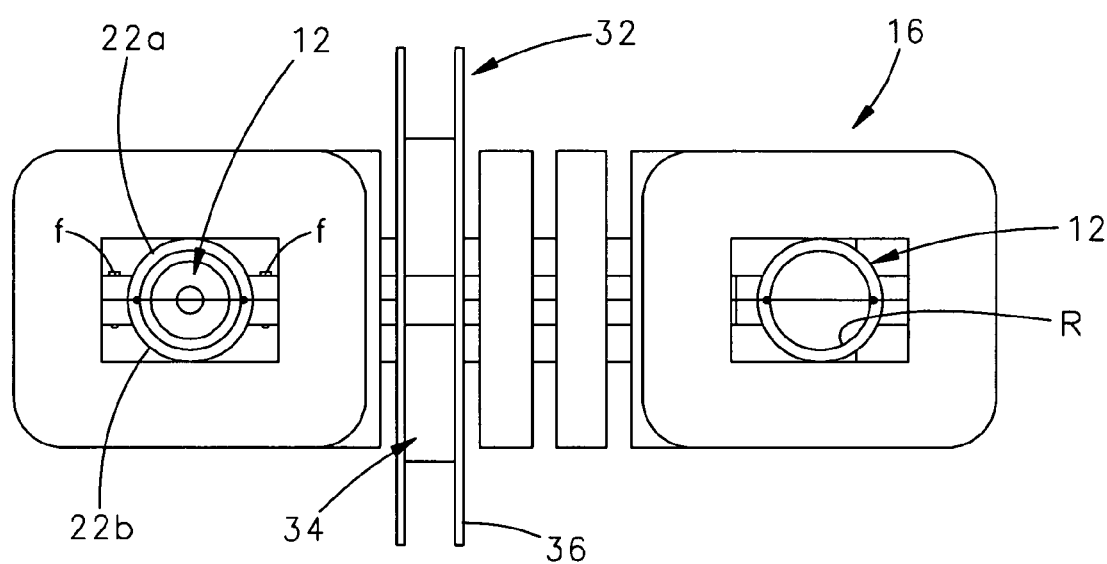
FIG. 1B is a sectional view taken along line 1B-1B of the torus motor system of FIG. 1A.
Figure 1C:
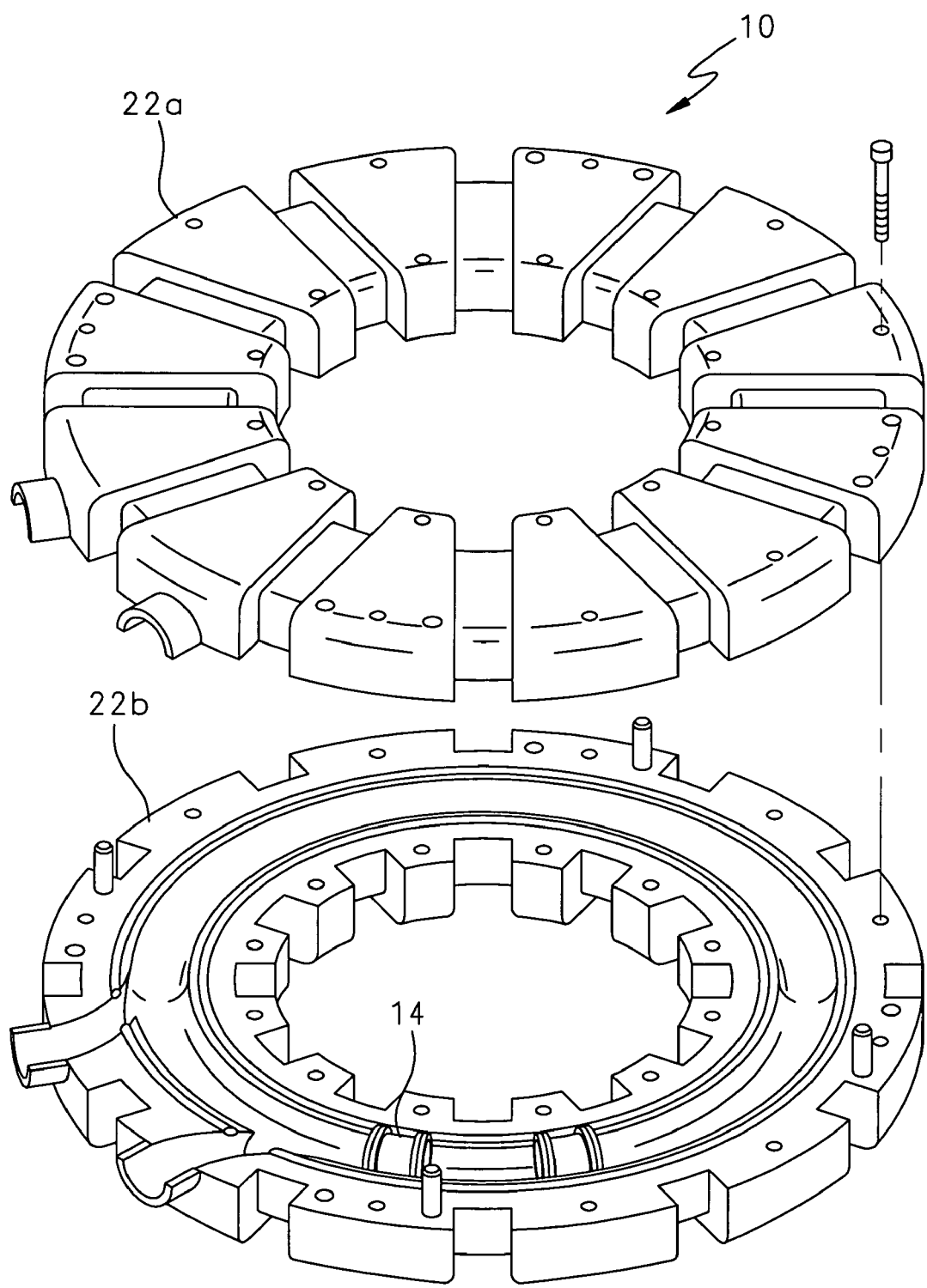
FIG. 1C is an exploded view of a stator assembly.

Referring to FIG. 1C, the hollow stator 12 is preferably formed of a first and a second stator portions 22a, 22b which are mounted together to define the rotor path R. The stator material is a non-magnetic material such as stainless steel or plastic. Each stator portions 22a, 22b is preferably a mirror image of the other. The separation between the stator portions 22a, 22b is preferably a plane which includes the center point A and divides the rotor path R, however, other separation planes will also be usable with the present invention.

Figure 1D:
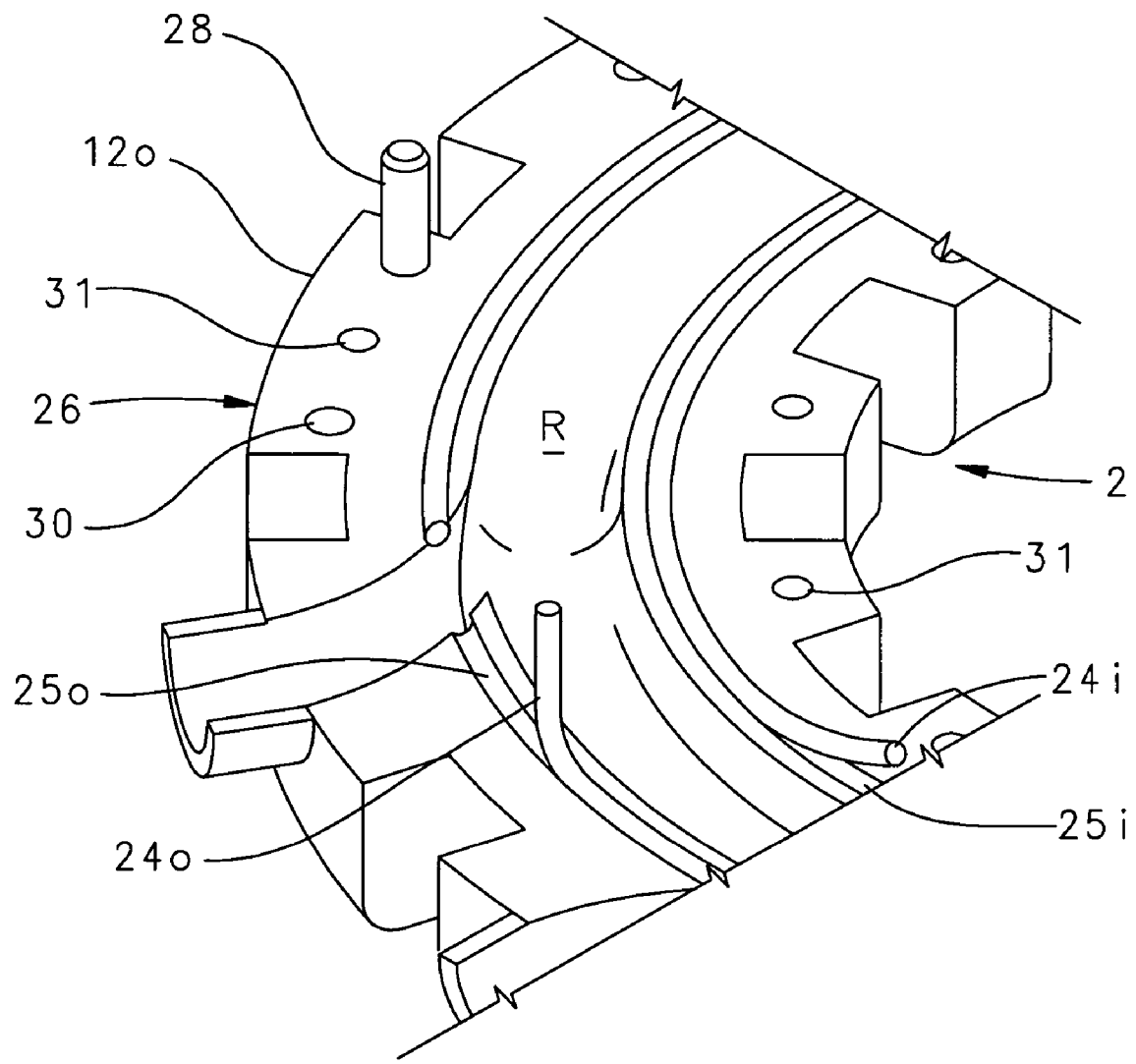
FIG. 1D is an expanded view of one side of a stator assembly.

Referring to FIG. 1D, a seal 24i, 24o, is located within a groove 25i, 25o defined about an inner circumference Ri and an outer circumference Ro of the rotor path R. The seals 24i, 24o seal the rotor path R when the stator portions 21a, 21b are assembled together.

The hollow stator 12 defines a multitude of teeth 26 about the rotor path R. Each tooth 26 defines a stator inner diameter 12i and a stator outer diameter 12o. Preferably, each tooth is frustro-triangular in shape. That is, the small end of the tooth 26 defines the stator inner diameter 12i while the large end of the tooth 26 defines the stator outer diameter 12o.

At least one alignment pin 28 is mounted within an aperture 30 formed in the tooth 26. Each tooth 26 is formed by the stator portions 22a, 22b to retain the magnet system 16 (FIG. 1B) and provide fastener receipt apertures 31 for fasteners f such that the fasteners f and pins 28 will not penetrate into the rotor path R (FIG. 1B).

It should be understood that although a particular component arrangement is disclosed in the illustrated embodiment, other arrangements will benefit from the instant invention. Alternatively, for example, the stator cross-section does not have a closed shape. A slot around the side of the stator guides a pin extending through the slot to transfer motion to some other device.

Figure 2A:
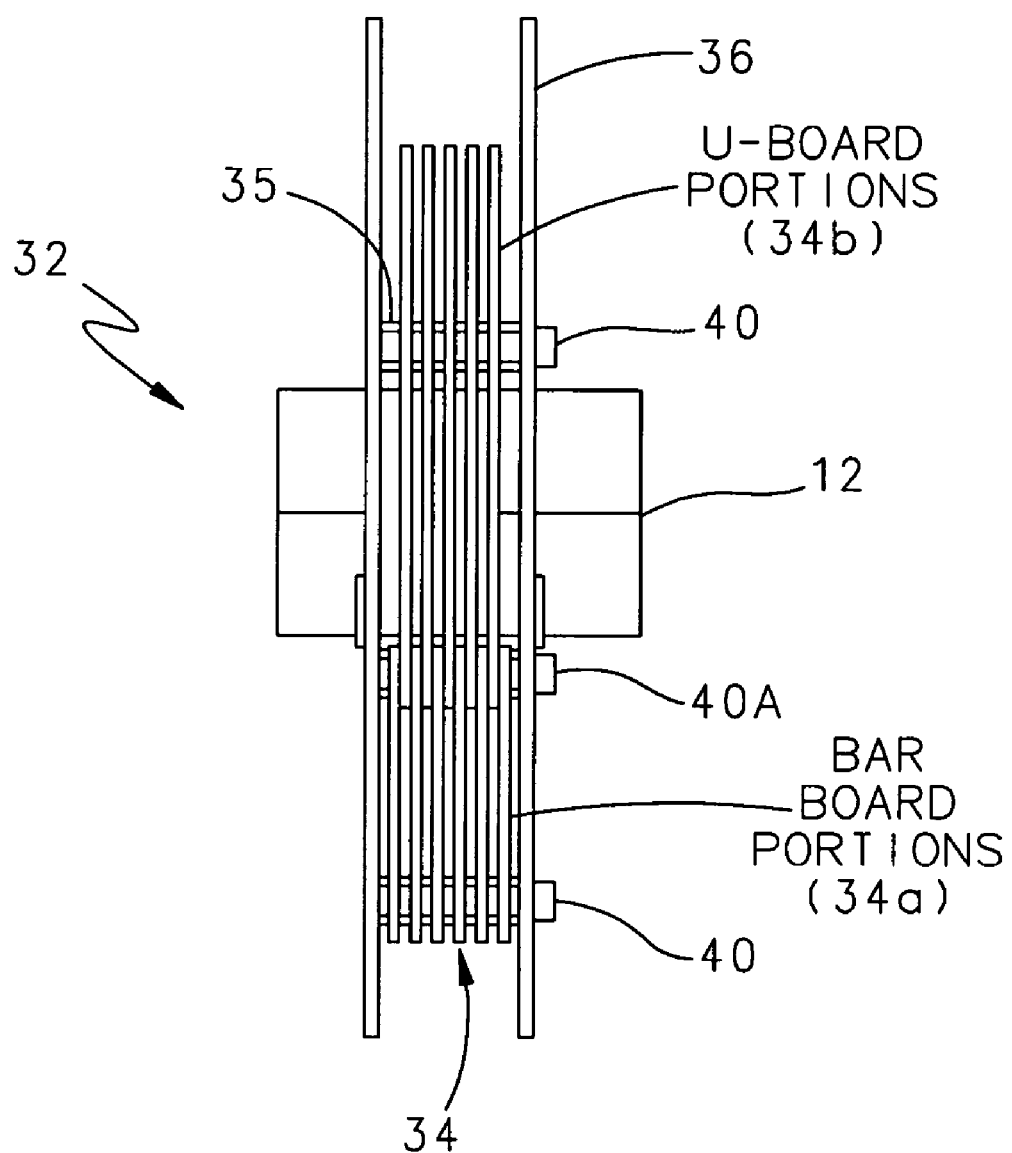
FIG. 2A is a top view of a magnet assembly.
Figure 2B:
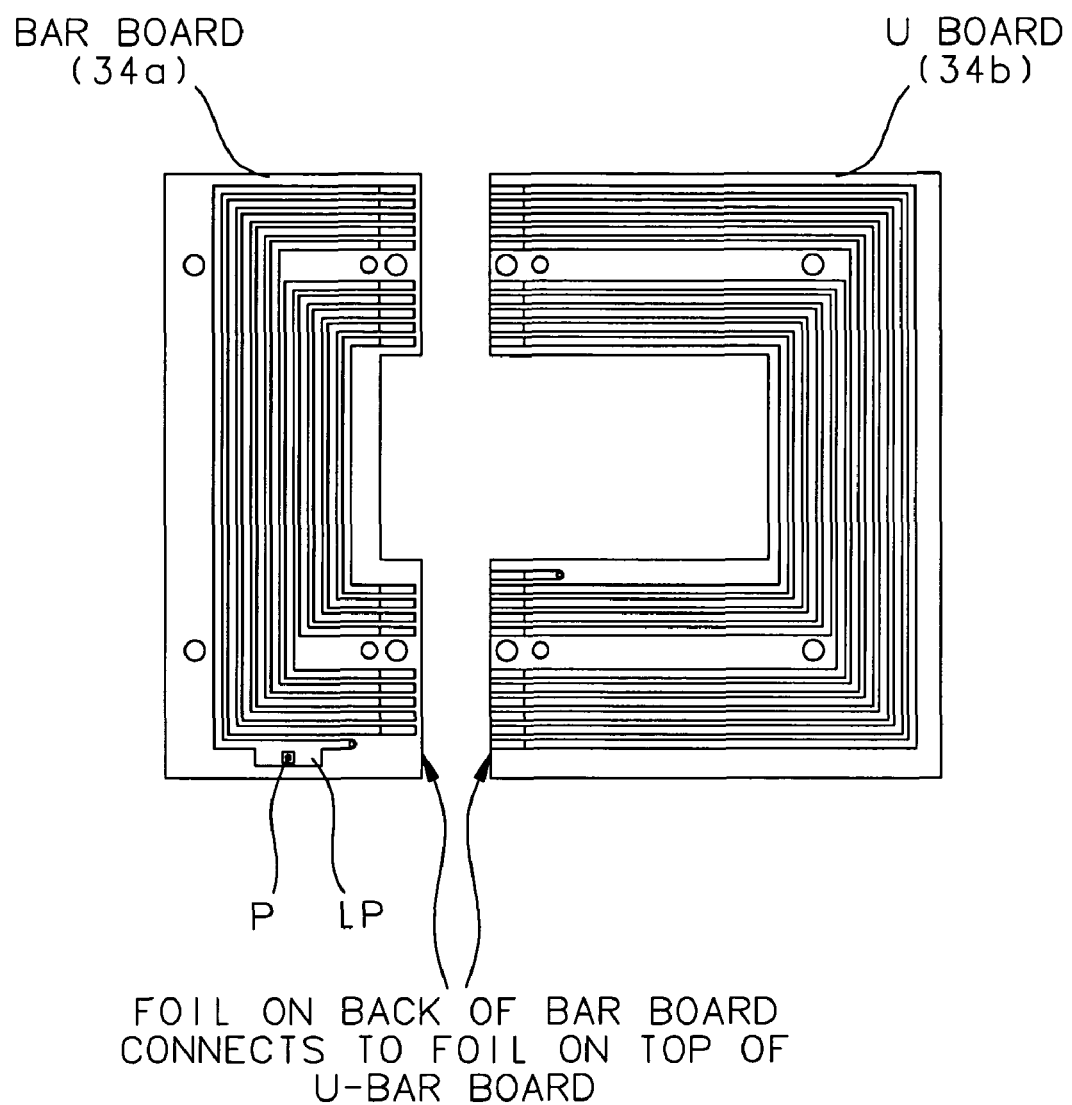
FIG. 2B is a face view of a magnet circuit board for the magnet assembly of FIG. 2A.
Figure 2C:
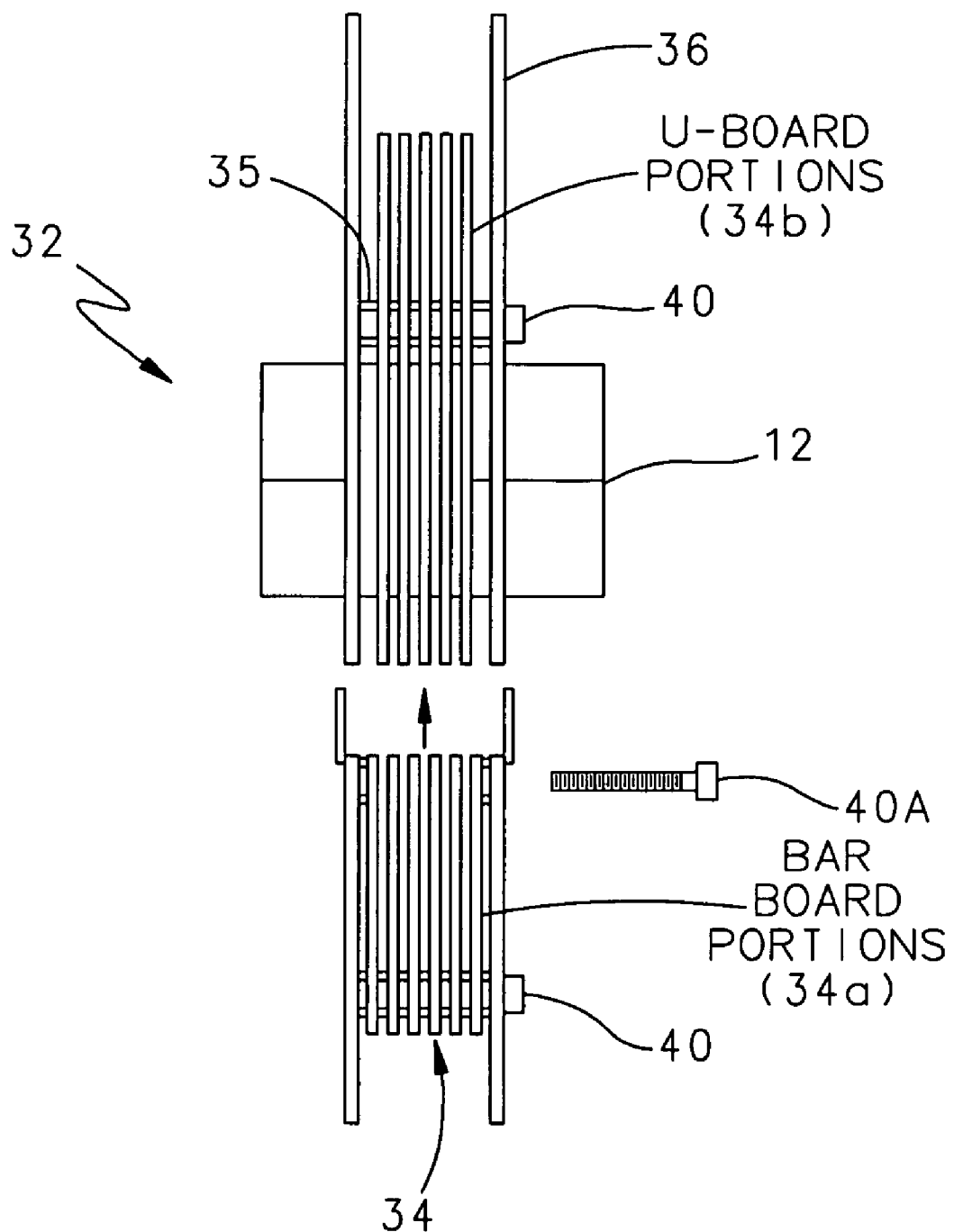
FIG. 2C is a top view of a magnet assembly in a disassembled condition.
Figure 2D:
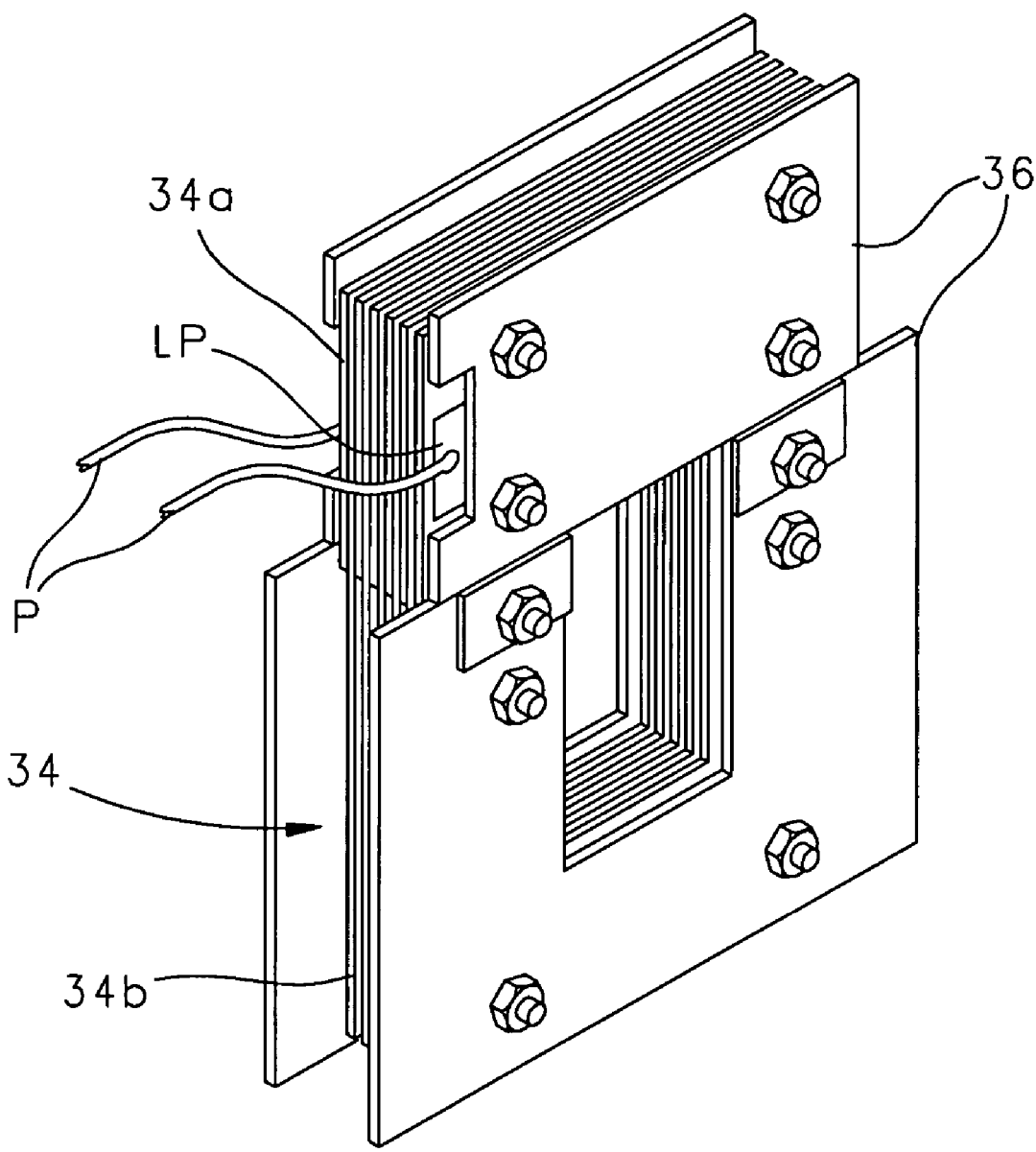
FIG. 2D is a perspective view of the magnet assembly of FIG. 2A.

Referring to FIG. 2A, the magnet system 16 includes a magnet assembly 32 which is mounted between each tooth 26 of the hollow stator 12 (FIG. 1B). Each magnet assembly 32 is preferably manufactured from a multiple of laminated magnet circuit boards 34 (FIG. 2B). Each magnet circuit board 34 is manufactured in board portions 34a, 34b to facilitate assembly around the hollow stator 12. The laminations of one board portion 34a are interleaved with the laminations of the other board portion 34b. The laminations have spacer washers 35 between layers to hold the board portions 34a, 34b to properly locate the mating board portions. The magnet circuit boards 34 are preferably located between cooling fins 36 and held together with fasteners 40 such as screws. The screws 40 are preferably threaded into the cooling fins 36 which are also manufactured in multiple portions to mount about the hollow stator 12. Each portion 32a, 32 may be first separately assembled (FIG. 2C) and then joined together around the stator by an interface fastener 40A.

Referring to FIG. 2B the magnet circuit board portions 34a, 34b have a circuit foil pattern on the back side. When assembled to be interleaved together, the magnet circuit boards 34 produce a coil of circuit foils. Circuit board portion 34a ("bar" because of its shape) has a power lead pad LP for connection of power leads P to power the magnet assembly 32.

Electrical current is communicated through the power lead P to the lead pad LP and passes through a plated through hole connected to a circuit foil on the other side of the board (cannot be seen on the drawing). That foil mates with the lowest foil on the top side of the U-bar circuit board portion 34b ("U-bar" because of its shape). The foil runs to the top of the U-bar circuit board 34b portion where it is mated with a foil on the back side of the next bar circuit board portion 34a and so on. The inner most foil on the U-bar board has a plated through hole that connects to the pattern on the back side. That is, when the boards are interleaved together (FIG. 2A) they form an electromagnetic circuit coil.

Generally, for the same size board, the larger the foil coils the less turns can be made, but higher currents can be carried and the impedance is lowered. Carried to the extreme, the boards could be entirely covered and provide two turns per lamination (one per side). This construction follows that of a type of magnet known as a Bitter disk which is a round copper foil with a hole in the middle. The disk also has a cut along a radius. These disks can be interleaved with thin insulation between them to form a helix. The disks overlap for a small distance at the cut where there is no insulation. The insulation is the same shape as the disks. Such round magnets are more efficient than other shapes (like the long thin windings of a typical rotary motor) and Bitter disk magnets are more efficient than round wire wound magnets.

It should be understood that a multitude of magnet types are usable with the present invention such as that various motor types (i.e. induction, Permanent Magnet, Switched Reluctance etc.) will benefit from the torus geometry.

Figure 3A:
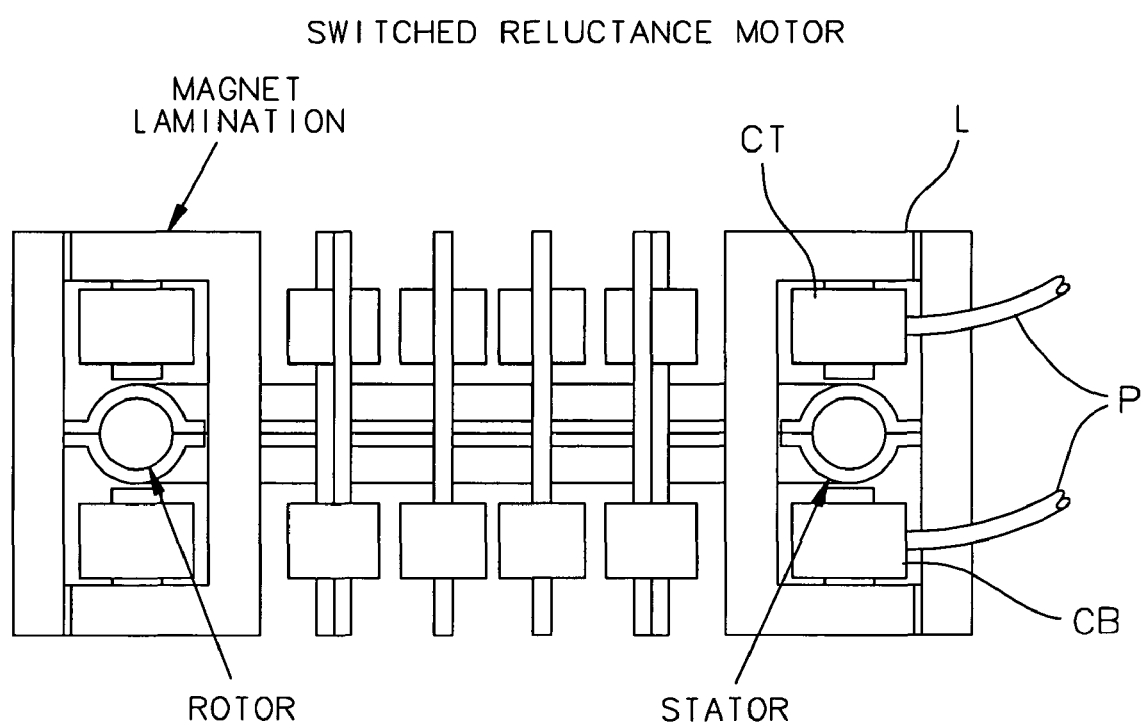
FIG. 3A is a sectional view of a switched reluctance torus motor system.
Figure 3B:
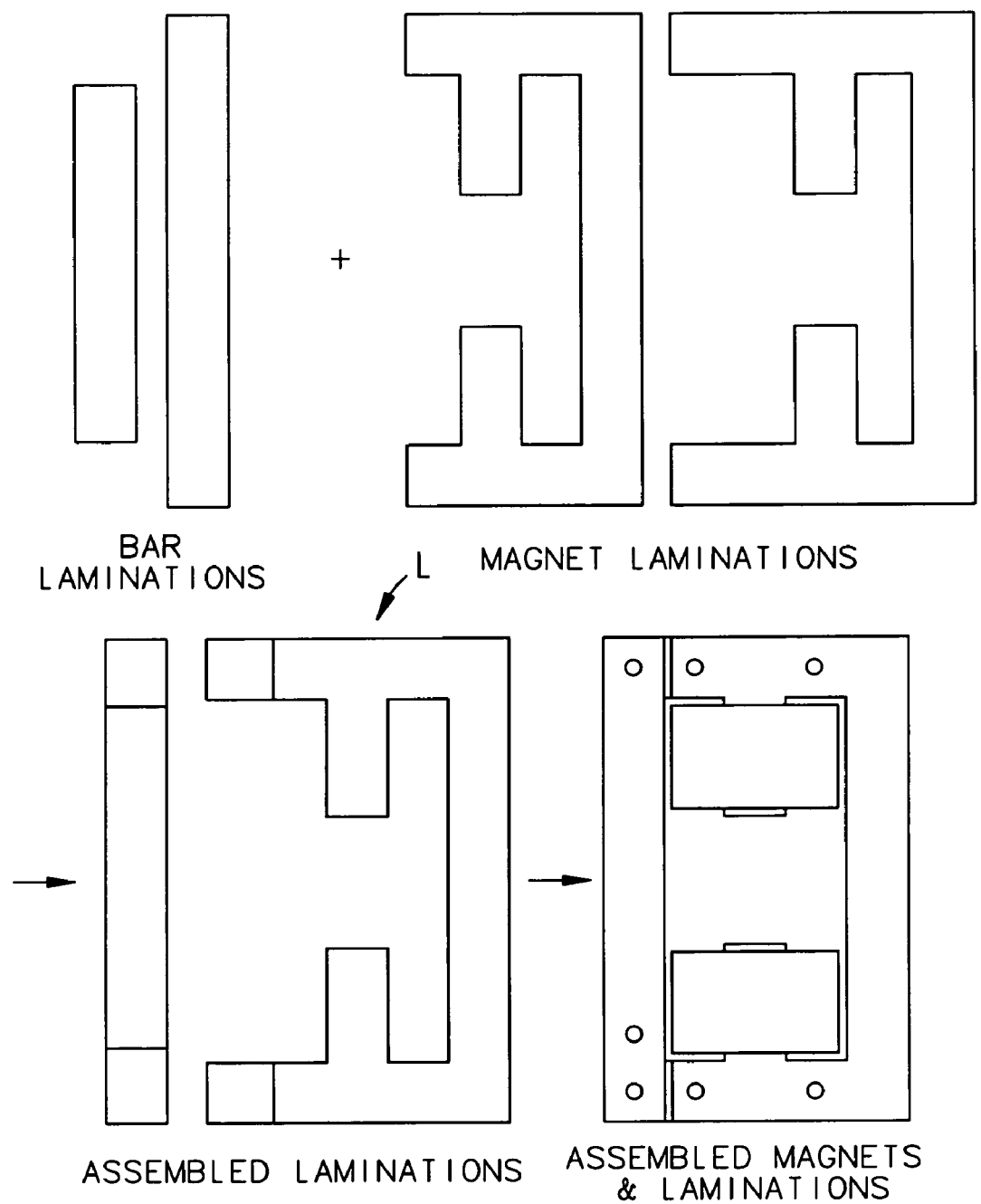
FIG. 3B is an exploded view of another magnet assembly.

Referring to FIG. 3A, a Switched Reluctance Torus motor is similar to the Induction Torus motor except magnet coils Ct, Cb are mounted in pairs to magnet lamination L, one on the top of the hollow stator 12 and one on the bottom, with laminations that go through the magnet cores and encircle the hollow stator 12. The magnet laminations (FIG. 3B) provide a path between the magnets for the magnetic flux. The iron in the rotor is attracted to the gap between the two magnets when they are energized as in a rotary reluctance motor.

Figure 4:
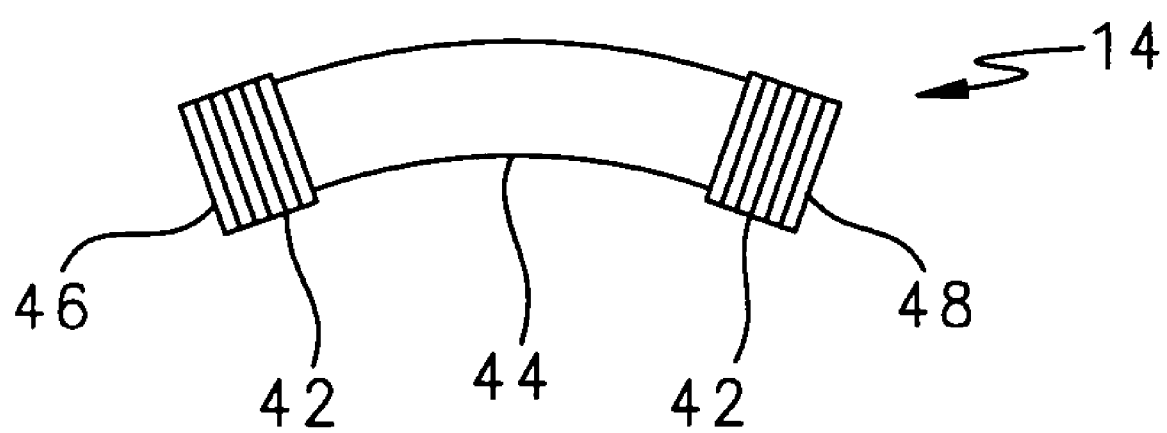
FIG. 4 is a side view of rotor for a torus motor system.

Referring to FIG. 4, the rotor 14 is at least partially arcuate in shape to match the internal geometry of the rotor path R. The rotor 14 includes a lamination 42 manufactured of magnetic material such as iron and/or steel. The lamination 42 fit within the rotor path R to match the interior geometry of the hollow stator 12. For example, with a rotor path R that is circular in cross section (FIG. 1B), the rotor 14 includes a multitude of washer-shaped laminations 42 which are retained together on a non-metallic arcuate rotor rod 44. The non-metallic arcuate rotor rod 44 is preferably a brass, stainless steel, plastic or other such like material. In this example, the arcuate rotor rod 44 extends longitudinally along the rotor path R. That is, the length of the arcuate rotor rod 44 along the rotor path R is greater than the width of the arcuate rotor rod 44 perpendicular to the rotor path R. The laminations 42 are sandwiched together with a head retainer 46 and a tail retainer 48 which are mounted to the arcuate rotor rod 44 through threading or the like. The leading surface of the head retainer 46 and the trailing surface of the tail retainer 48 are generally planer. The retainers 46, 48 are preferably manufactured of non-metallic materials such as stainless steel, Teflon or other such like material and may at least partially operate as a seal within the rotor path R of the hollow stator 12. The preferred thickness of the lamination is generally between half and one times the thickness of the magnet assemblies 32 within the magnet system 16. Each rotor 14 preferably contains more than one set of laminations (a set of laminations will hereafter be called a rotor lobe). The spacing and size of these lobes depends on the spacing and thickness of the magnets. In this example, the rotor rod 44 does not extend as far from the rotor path R as the lobes. The lobes contact the stator 12 to limit movement of the rotor 14 away from the rotor path R rather than the rotor rod 44. The diameter of the lobes is thus greater than the diameter of the rod 44.

The forces on the rotor all tend to center the rotor in the rotor path R of the hollow stator 12. Both magnetic forces and the force of fluid trying to blow by the rotor 14 tend to center it in the rotor path R. The forces tend to impact the face of the rotor laminations 42 and if the tolerances between the rotor and stator are minimized, there may not be a need for a seal at all. That is, the rotor 14 will ride on a fluid bearing (similar to a hydrostatic bearing), or a gas bearing if compressing a gas.

Figure 5:
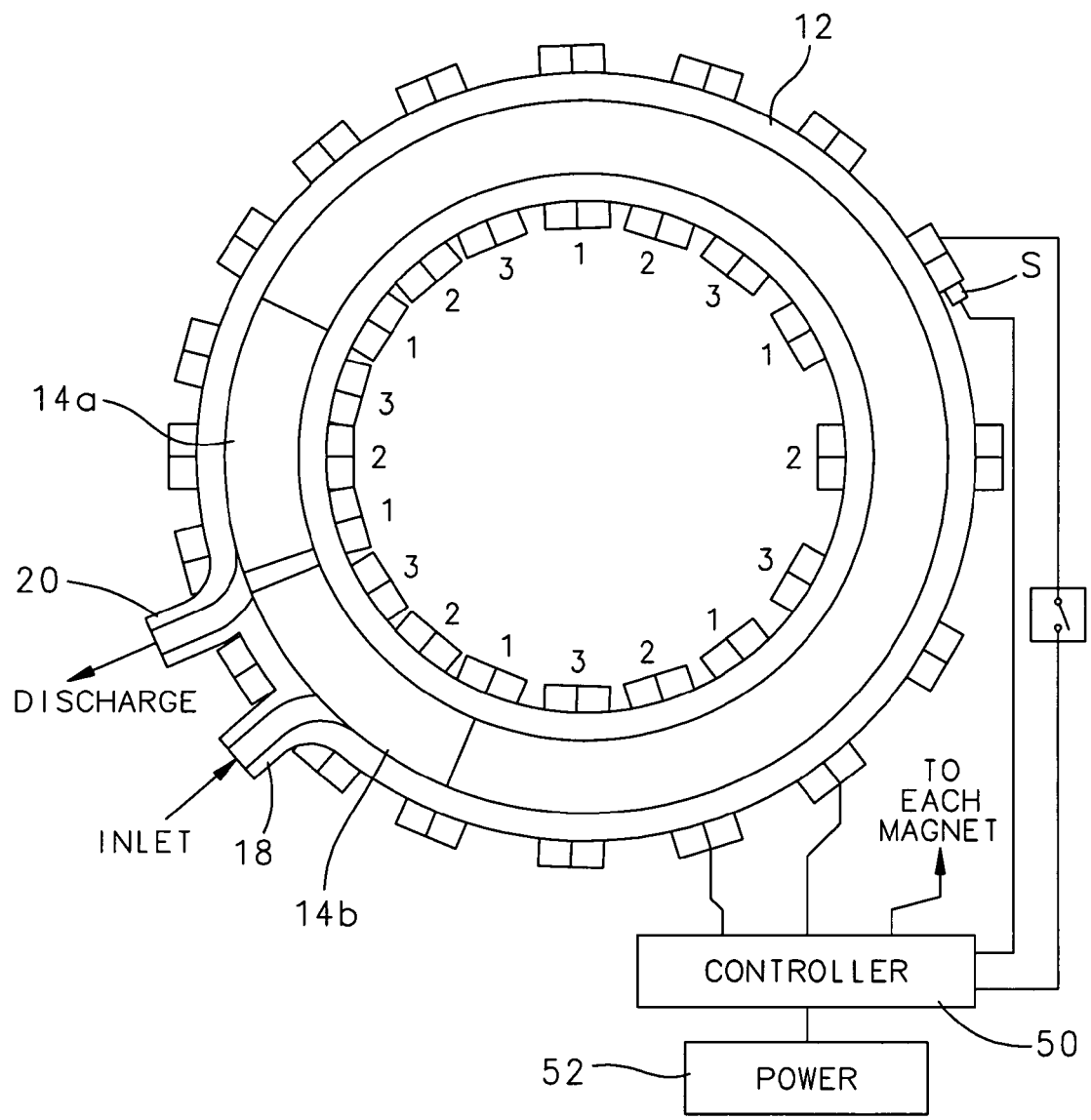
FIG. 5 is a top view of an torus motor system illustrating a magnet system geometry.

Referring to FIG. 5, a controller 50 drives the magnet system 16. The controller 50 may be a variable speed controller, a switched reluctance speed controller which controls a poly-phase power source 52. Induction and Switched Reluctance Torus motors need special control considerations. Although the induction motor could be connected directly to the power source, the benefits of an electronic drive are preferred. For further understanding of other aspects of the unique control needs with the Torus motor which and associated components thereof, attention is directed to United States Patent Application 2006/0152091, entitled "TRANSISTOR MATRIX SWITCHED RELUCTANCE VARIABLE SPEED MOTOR DRIVE," which is assigned to the assignee of the instant invention and which is hereby incorporated herein in its entirety.

Figure 6:
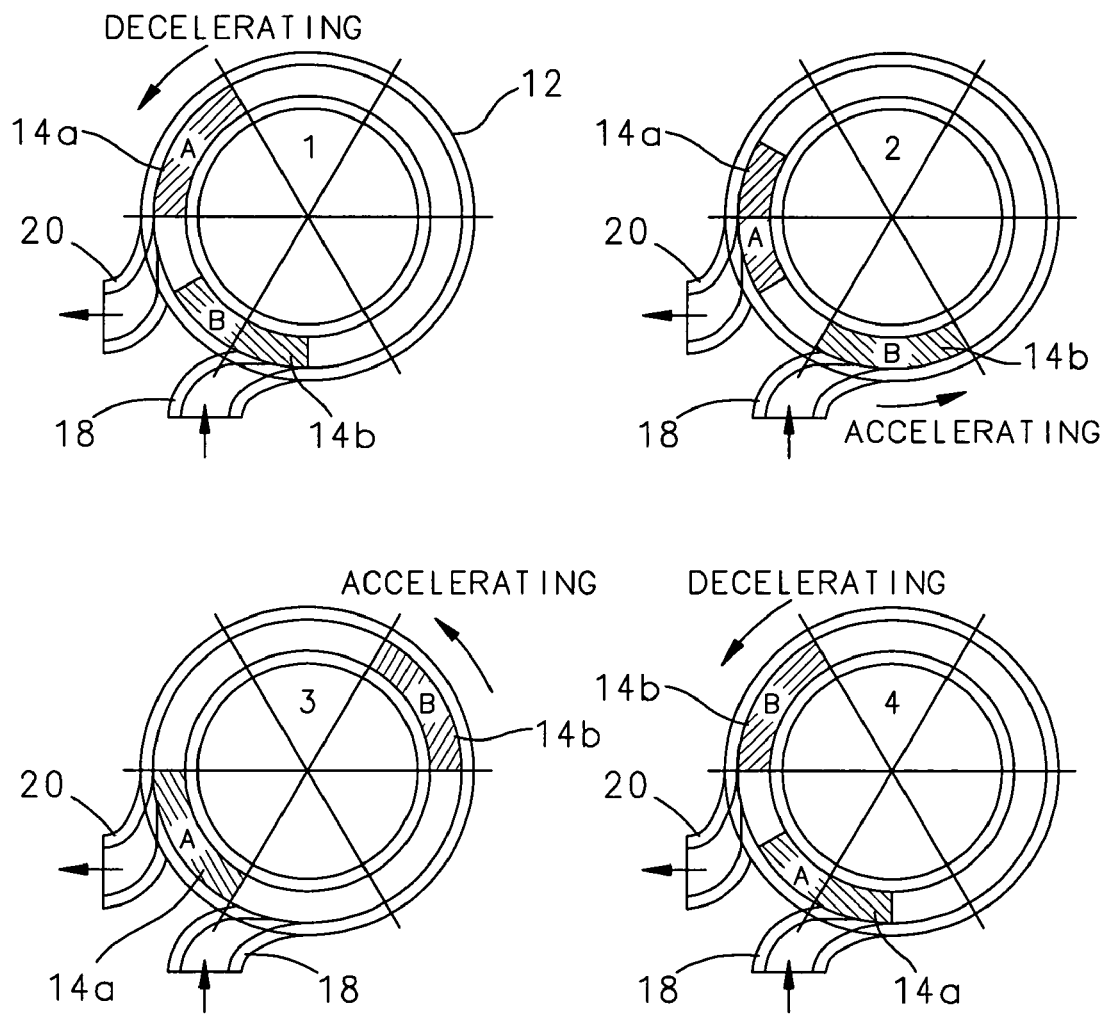
FIG. 6 is a sequential illustration of a torus motor system illustrating movement of a multiple of rotors within the stator.

The arrangement of the magnet system 16 for the polyphase power source 52 such as arrangement for a three phase motor includes the phases (1, 2, and 3) as illustrated in FIG. 5. The magnets are preferably spaced such that at one end they are farther apart then at the other. This arrangement has several advantages. The controller only has to maintain one frequency. The rotor 14 will speed up and slow in response to the magnet spacing (FIG. 6). The pole spacing is actually a gradient, as opposed to fixed spacing in the case of common squirrel cage induction motors.

The magnet geometry provides for magnets that are spaced the farthest apart to move the rotor the fastest, but provide the lowest load (i.e. the magnetic attractive forces diminish with distance). Conversely, magnets that are spaced the closest move the rotor the slowest but provide much more load. This is preferred because as the rotor passes the inlet, there is little load on it. The load increases as the rotor approaches the discharge (because it is compressing gas in front of the rotor and pulling a vacuum behind the rotor). The magnets should therefore be spaced farthest apart where the load is smallest, and closest where the load is the largest.

Although this geometry may have wider use, it is conceived primarily for pump and compressor applications. The four views (1-4) show various points in a cycle with two rotors 14a, 14b. The two rotors 14a, 14b move in a circular path within the hollow stator 12. The rotors do not move at constant speed around the hollow stator 12. As they pass the inlet port 18 they accelerate, as they approach the discharge port 20 they decelerate. View 1 shows rotor 14a approaching the discharge port 20 (it is slowing down) while rotor 14b is passing the inlet port 18 (it is speeding up). View 2 shows both rotors at about the same speed. View 3 shows that because of the difference in speed, air is being drawn into the stator through the inlet port 18, and at the same time the air between the rotors (top left) is being compressed. View 4 shows rotor 14a passing the discharge port 20 and the air being pushed out by rotor 14b. If a cycle is defined as one rotor going completely around the stator, the four views depict one half of a cycle. There are two compression cycles (one for each rotor) for each revolution of the rotors.

Pump applications are similar, except that liquid pumps would have larger inlet and discharge ports so that the discharge port is open when the trailing rotor closes the inlet port. This is because liquids do not compress much, so the discharge port needs to be open so that the trailing rotor can push the liquid out the discharge.

To maintain a multitude of rotors 14 in a desired relative orientation, at least one magnet is selectively switched on or off in response to a sensor S which communicates with the controller 50. The position of the rotors are sensed by the sensor and the particular magnet is shut down for a time to cause the rotor passing the particular magnet to slow more than normal. This allows the rotors to be controlled and maintained in sync. The magnet directly across from the inlet and discharge is preferred (FIG. 5). The switch for the magnet may be a transistor, and the sensor may be a Hall effect device located on the inlet side of the magnet such that the rotor is sensed as it approached the magnet.

Figure 7A:
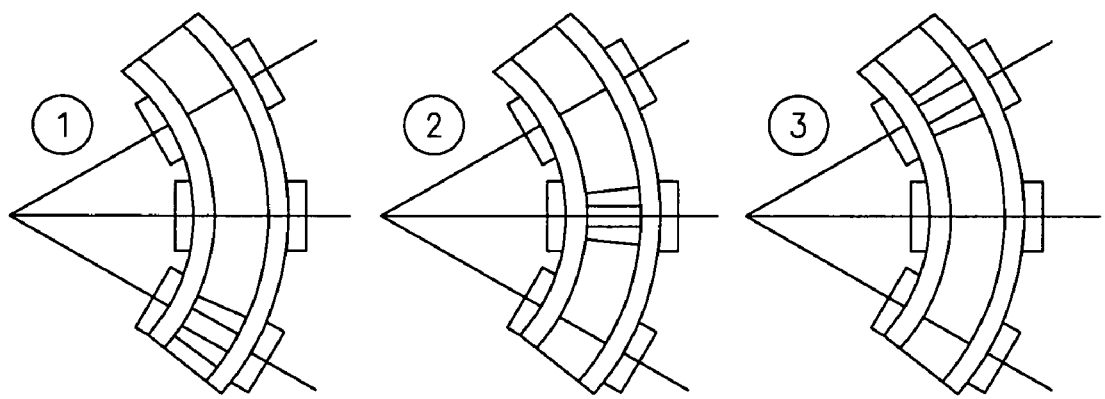
FIG. 7A schematically illustrates a magnet firing order and rotor movement for a one-lobe rotor.
Figure 7B:
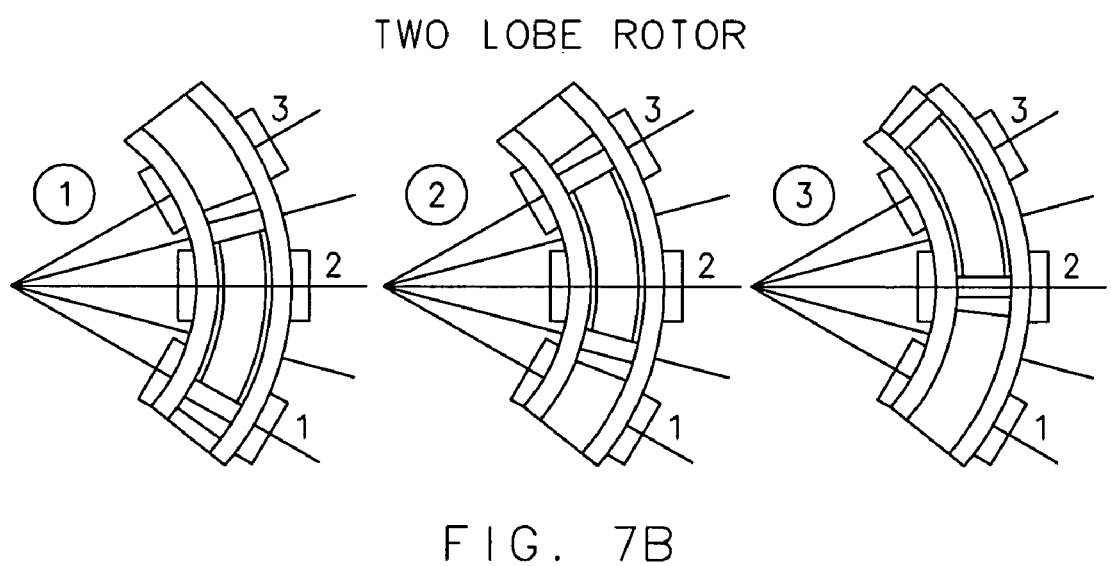
FIG. 7B schematically illustrates a magnet firing order and rotor movement for a two-lobe rotor.

Referring to FIGS. 7A and 7B the magnet firing order and rotor movement for a one lobe rotor and a two lobe rotor (FIG. 7B) are illustrated. The magnets are spaced 30° apart. The firing sequence for the one-lobe rotor energizes the magnet in a counter clockwise order, the rotor will rotate counter clockwise 30° each time the next magnet ahead of the rotor is fired.

Referring to FIG. 7B, the length of the two lobe rotor is one and one half the distance between the magnets. The two-lobe rotor has a different firing order. View 1 shows the rotor positioned after the first magnet has been energized. This brings the leading end of the rotor in range of the third magnet. The third magnet is then energized, which brings the trailing end in range of the second magnet. This firing sequence moves the rotor clockwise 15° each firing of a magnet.

The two-lobe rotor moves at half speed as the one-lobe rotor (FIG. 7A), but the load is higher. This is analogous to rotor motors with different numbers of poles. The two-lobe rotor develops much more than twice the load of the one lobe rotor, because the magnetic force acting on the rotor is proportional to the inverse square of the distance from the rotor lobe to the center of the magnet. More lobes provide slower but more powerful motors, however, the rotors must be lengthened to add more lobes which may require increasing the stator diameter and using more magnets.

Figure 8:
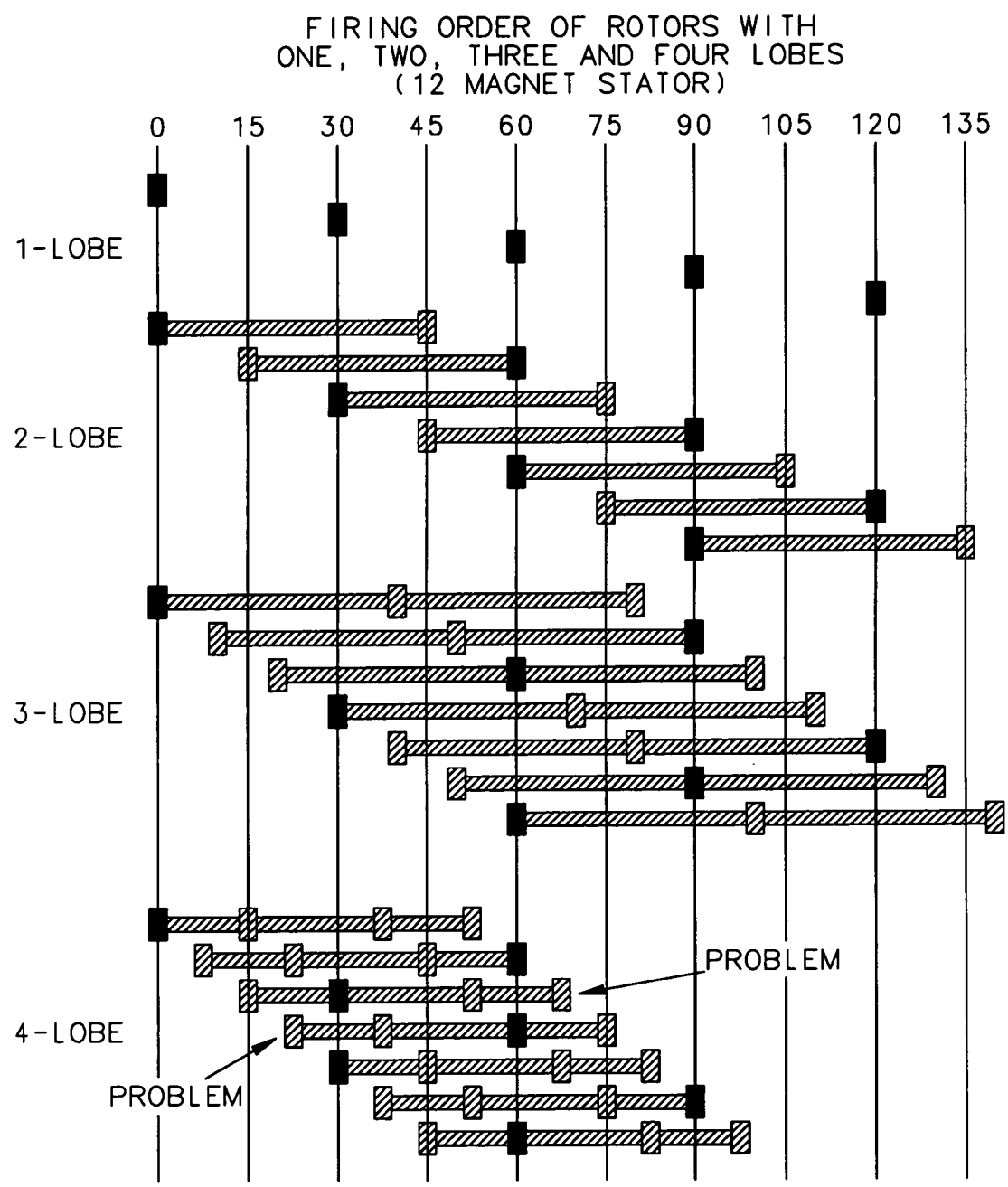
FIG. 8 schematically illustrates a magnet firing orders for rotors with one, two, three and four lobes on a twelve magnet stator.

FIG. 8 illustrates a magnet firing orders for rotors with one, two, three and four lobes on a twelve-magnet stator. The magnets are evenly spaced, 30° apart. The lines across the chart illustrate rotary travel in degrees. The vertical lines represent the magnet placement on the stator. The rotors are shown at positions where they line up with an energized magnet. The shaded rotor lobe is the lobe that is under the influence of an energized magnet.

The first firing order is for a one-lobe rotor. The sequence is 0, 30, 60, 90 and 120 degrees. The rotor moves 30° each time a magnet is fired.

The second sequence is for a two-lobe rotor. The sequence is 0, 60, 30, 90, 60, 120 and 90 degrees. The rotor moves 15° each time a magnet is fired.

The third sequence is for a three-lobe rotor. The sequence is 0, 90, 60, 30, 120, 90 and 60 degrees. The rotor moves 10° each time a magnet is fired.

There is a problem for motors with more than two lobes. Depending on the length, number of lobes and lobe spacing there may be cases in the firing sequence where a magnet will be acting on two lobes, pulling one forward and one backward such that the rotor will freeze. The bottommost sequence for a four-lobe rotor shows this problem (marked with arrows).

Figure 9:
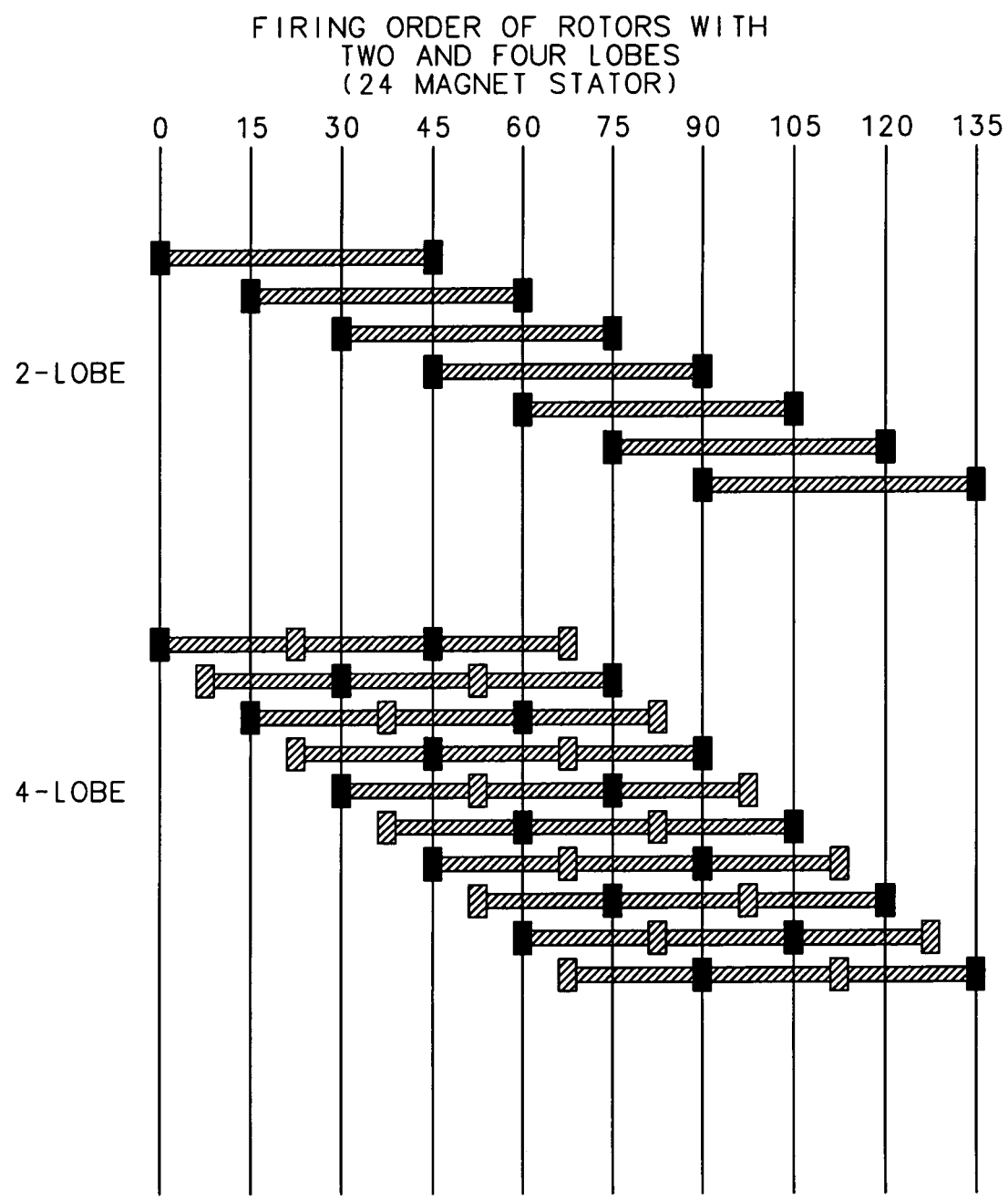
FIG. 9 schematically illustrates a magnet firing orders for two magnets firing at the same time and acting on two and four lobe rotor on a 24 magnet stator.

FIG. 9 illustrated two magnets firing at the same time and acting on two rotor lobes. This doubles the load capability. A two-lobe rotor firing sequence is shown on top and a four-lobe sequence is shown on the bottom which corrects the deficiency pointed out in FIG. 8. Note that this chart is for a 24-magnet stator with magnets spaced at 15° intervals.

Any combination of rotor lengths, number of rotor lobes, lobe spacing, diameter of stator, number of magnets and magnet spacing may be utilized with the present invention. These options make the torus motor adaptable to different speed/load applications. The same stator for example may be combined with different rotors to provide different speed/load capabilities.

The major components of the efficiency of a rotary screw compressor are the air end, the motor and the package losses. The air end and motor efficiencies go up as the size of the machine increases. The following table shows the efficiency ranges of these components from 10 Hp to 100 Hp machines. Cooler losses are not considered.

| Rotary Screw Air compressors 10-100 HP | Efficiency |
| --- | --- |
| Air End Efficiency | 75%-85% |
| Motor Efficiency (Premium Efficiency) | 85%-95% |
| Package Losses | 4%-5% |
| Total Efficiency | 60%-75% |

A Torus motor/compressor efficiency compares favorably because there are almost no air end losses and the package losses are less because of minimal piping and no oil separator. The efficiency of the compressor will be slightly less than the motor efficiency. Because there are fewer constraints on magnet design, there is reason to believe that because of better magnet designs, torus motors can be more efficient than rotary motors.

The torus motor in the example could be high speed without the problems normally associated with high rpm motors. The rotor has little inertia and there are no bearings to limit speed. High volumes could be moved with a relatively small package. The above example would operate as an effective low speed pump but high speed would probably require four rotors and two sets of inlet and discharge ports. Because there are few components and no couplings or gears between the driving force and the work, better efficiency is improved. The geometry of the motor windings is also less constrained than in typical rotary motors, so greater system efficiency could be realized with more efficient electric magnet designs. Even if the torus motor has the same efficiency as above, the torus compressor may have a power efficiency of 80%-90% compared to 60%-75% (a 15% to 20% advantage).

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A rotary machine comprising:
   a hollow stator which defines an elliptical rotor path;
   a longitudinal rotor mounted within said elliptical rotor path, said longitudinal rotor extending arcuately along said elliptical rotor path; and
   a magnet system mounted about said stator to drive said longitudinal rotor along said elliptical rotor path.

2. The rotary machine as recited in claim 1, wherein said elliptical rotor path is circular.

3. The rotary machine as recited in claim 1, wherein said hollow stator includes a multitude of teeth.

4. The rotary machine as recited in claim 1, wherein said rotor includes a multiple of lobes.

5. The rotary machine of claim 4 wherein the diameter of the at least partially arcuate non-metallic rod and is less than the diameter of the multiple of lobes mounted to said non-metallic rod.

6. The rotary machine as recited in claim 1, wherein said hollow stator limits rotation of said longitudinal rotor in a direction transverse said elliptical rotor path.

7. The rotary machine as recited in claim 1, wherein said elliptical rotor path defines a plane and said hollow stator limits rotational movement of said longitudinal rotor in a direction transverse said plane.

8. The rotary machine as recited in claim 1, wherein said longitudinal rotor mounted within said elliptical rotor path is mounted separate from a second longitudinal rotor mounted within said elliptical rotor path.

9. The rotary machine as recited in claim 8, wherein said longitudinal rotor extends in a direction aligned with said elliptical rotor path.

10. The rotary machine as recited in claim 1, wherein said longitudinal rotor extends arcuately along said elliptical rotor path and terminates into front and rear surfaces, wherein the longitudinal rotor is longer in the longitudinal direction than the front and rear surfaces.

11. The rotary machine as recited in claim 10, wherein said front and rear surfaces are planar surfaces and are transverse to said longitudinal rotor.

12. The rotary machine as recited in claim 10, wherein said front and rear surfaces extend radially relative to said elliptical rotor path.

13. The rotary machine of claim 10, wherein an axial end portion of said longitudinal rotor extends closer to said hollow stator than an axial central portion of said longitudinal rotor.

14. A rotary machine comprising:
   a hollow stator which defines an elliptical rotor path;
   an intake in communication with said elliptical rotor path;
   a discharge in communication with said elliptical rotor path;
   a multiple of longitudinal rotors separately mounted within said elliptical rotor path, each of said multiple of longitudinal rotors including an at least partially arcuate non-metallic rod and a multiple of lobes mounted to said non-metallic rod; and
   a magnet system mounted about said stator to drive said multiple of longitudinal rotors along said elliptical rotor path to communicate a fluid from said intake to said discharge.

15. The rotary machine as recited in claim 14, wherein said hollow stator includes a multitude of teeth.

16. The rotary machine as recited in claim 15, wherein said hollow stator includes a multitude of unequally spaced teeth.

17. The rotary machine as recited in claim 15, wherein a magnet assembly of said magnet system is mounted between each of said multitude of teeth.

18. The rotary machine as recited in claim 14, wherein one of said multiple of longitudinal rotors is moveable along said elliptical rotor path relative another one of said multiple of two longitudinal rotors.

19. The rotary machine as recited in claim 14, wherein said hollow stator limits rotation of said multiple of longitudinal rotors in a direction transverse said elliptical rotor path.

20. The rotary machine of claim 14, wherein the multiple of lobes contact the hollow stator to prevent the non-metallic rod from contacting the hollow stator.

21. A rotary machine comprising:
a hollow stator which defines an elliptical rotor path;
at least two longitudinal rotors separately mounted within said elliptical rotor path, said at least two longitudinal rotors extending in a first direction aligned with said elliptical rotor path; and
a magnet system mounted about said stator to drive said at least two longitudinal rotors along said elliptical rotor path.

22. The rotary machine as recited in claim 21, wherein said at least two longitudinal rotors each extend in the first direction and terminate into front and rear surfaces.

23. The rotary machine as recited in claim 21, wherein one of said at least two longitudinal rotors is moveable along said elliptical rotor path relative another one of said at least two longitudinal rotors.

* * * * *